US010373061B2

(12) United States Patent
Kennel et al.

(10) Patent No.: US 10,373,061 B2
(45) Date of Patent: Aug. 6, 2019

(54) COLLABORATIVE PROFILE-BASED DETECTION OF BEHAVIORAL ANOMALIES AND CHANGE-POINTS

(71) Applicant: FAIR ISAAC CORPORATION, San Jose, CA (US)

(72) Inventors: Matthew Kennel, San Diego, CA (US); Hua Li, San Diego, CA (US); Scott Michael Zoldi, San Diego, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 620 days.

(21) Appl. No.: 14/566,545

(22) Filed: Dec. 10, 2014

(65) Prior Publication Data

US 2016/0171380 A1   Jun. 16, 2016

(51) Int. Cl.
*G06N 7/00* (2006.01)
(52) U.S. Cl.
CPC .................... *G06N 7/005* (2013.01)
(58) Field of Classification Search
CPC .......................... G05B 23/0254; G06N 99/005
See application file for complete search history.

(56) References Cited

U.S. PATENT DOCUMENTS

| 2001/0049690 | A1 | 12/2001 | McConnell et al. | |
| 2006/0206445 | A1 | 9/2006 | Andreoli et al. | |
| 2010/0161810 | A1 | 6/2010 | Vaidyanathan et al. | |
| 2013/0218807 | A1 | 8/2013 | Liao et al. | |
| 2014/0101762 | A1 | 4/2014 | Harlacher et al. | |
| 2014/0180974 | A1* | 6/2014 | Kennel | G06N 7/005 706/12 |
| 2014/0236386 | A1* | 8/2014 | Yoshizawa | B60W 30/08 701/1 |
| 2014/0289867 | A1* | 9/2014 | Bukai | G06Q 20/4016 726/28 |
| 2014/0358841 | A1* | 12/2014 | Ono | G08G 1/0112 706/52 |

OTHER PUBLICATIONS

'A Framework for Near Real-Time Event Characterization Within the Internet': Planck, 2011, IEEE, 978-1-4577, pp. 59-66.*

* cited by examiner

*Primary Examiner* — Robert A Cassity
*Assistant Examiner* — Peter D Coughlan
(74) *Attorney, Agent, or Firm* — Mintz Levin Cohn Ferris Glovsky and Popeo, P.C.; F. Jason Far-hadian, Esq.

(57) ABSTRACT

A predictive estimator, trained on a data corpus, is used to generate a probability estimate based a sequence of data related to an entity. The predictive estimator computes an instantaneous surprise score which is a quantification of a short-term deviation of a datum from the probability estimate. To compute the instantaneous surprise score, the predictive estimator is initialized with default values of the predictive estimator. Then, for each of data input of the datum to the predictive estimator, the instantaneous surprise score is calculated, corresponding to the deviation of the data input from the probability estimate. This generates an estimate of the probability of observing the datum given past data on the entity and the predictive estimator. The predictive estimator is updated with the datum and the time step advanced.

20 Claims, 4 Drawing Sheets

COLLABORATIVE PROFILE-BASED DETECTION OF BEHAVIORAL ANOMALIES AND CHANGE-POINTS

TECHNICAL FIELD

The subject matter described herein relates to behavior analytics, in particular, to the detection of behavior anomalies and change-points using statistical methods.

BACKGROUND

Qualitatively, the origin of a change-point, as that term is used in the statistical literature, can be often a result of some underlying event, an eventful moment in time, and in applications this is the phenomenon of interest. For instance, in an industrial automation system, the change may be from some failure in the production hardware or materials input. In a consumer marketing application, the event at the change-point could be a customer moving into a new house, or a new child. In a security profiling application, the event at the change-point could be an underlying personal change in the subject which exposes an employer to more (or less) risk, for instance, a major financial setback, a narcotics habit, adoption of radical ideology, or compromise by an enemy.

The particulars of the statistical model depend on the specific nature of the data being fitted and the underlying hypotheses one wishes to test. Consider the situation when the time series are categorical, that is each observation is a draw from a discrete distribution without any assumed ordering. Then typically one would test hypotheses such as whether the underlying multinomial distribution (assuming independent draws) before and after a hypothesized change-point are significantly different or not.

A significant limitation of almost all existing approaches is that they model one only time series at a time to search for change-points, and do not consider using multiple time series from similar, but non-identical generating processes. In some problem settings, many time series of a generally similar nature can be observed, each presumably drawn from some generally similar underlying mechanism but each with different parameter settings. Their lengths may be different, and some of these time series may have change-points and some may not. Despite the apparent diversity, there is some underlying regularity; often, they are all the same type of measurement on similar entities in a similar setting. Examples include, without limitation, recurrent purchase behaviors of different shoppers at a store, communication behaviors of distinct computer clients on a network, and activities of different users on a social network Internet web site.

The set of all observed time series of a similar type is often called a data corpus. Even though any individual time series is usually distinct from others in a data corpus, there are usually regularities and underlying common behavior patterns beneath the superficial diversity. These patterns may be elucidated by a corpus-level analysis, and subsequently used in change-point detection methods. This setting is distinct from the problem of detecting change-points in vector-valued time series, which is adequately addressed in existing published literature.

SUMMARY

This document describes a system and method for detecting change-points and anomalies, or lack thereof, leveraging the properties of a data corpus, even if the individual time series need not have the same change-points or anomalies. The detection of change-points can be refined and processed to gain further confidence with additional time-series data to enforce or reduce the magnitude and location of event points in data.

In one aspect, a predictive estimator, trained on a data corpus, is used to generate a probability estimate based a sequence of data related to an entity. The predictive estimator computes an instantaneous surprise score which is a quantification of a short-term deviation of a datum from the probability estimate. To compute the instantaneous surprise score, the predictive estimator is initialized with default values of the predictive estimator. Then, for each of data input of the datum to the predictive estimator, the instantaneous surprise score is calculated, corresponding to the deviation of the data input from the probability estimate. This generates an estimate of the probability of observing the datum given past data on the entity and the predictive estimator. The predictive estimator is updated with the datum and the time step advanced.

In some variations, the instantaneous surprise score can be transformed according to a normalization by a probability estimate not particular to the entity, a function of the probability estimate, a negated logarithm function, a truncation that limits to low and/or high values, a filter of a sequence of instantaneous surprise scores or their transforms, a normalization by filtered instantaneous surprise scores or functions and/or transforms of the filtered instantaneous surprise scores, and a calibration function.

In an interrelated aspect, a latent parameter estimator generates a latent parameter estimate for data related to an entity based on a sequence of data related to an entity received by the latent parameter estimator. The latent parameter estimator is also trained on a data corpus. The latent parameter estimator computes an instantaneous surprise score which is a quantification of a change of latent parameter estimates. To compute the instantaneous surprise score, the latent parameter estimator is initialized with default values of the latent parameter estimator. Then, for each of the data input of the datum to the latent parameter estimator, the instantaneous surprise score is calculated, corresponding to a function of one or more latent parameter estimates. The latent parameter estimator is updated with the current datum and the time step advanced.

In some variations, the latent parameter model can be a topic model, where the latent parameter estimates can be estimated topic allocations using data observed up to a given time point.

The instantaneous surprise score can be a deviation measure on the latent parameter estimates, or functions of them, before and after they have been updated with the current datum. Also, the instantaneous surprise score can be a deviations measure between latent parameter estimates, or functions thereof, having a rapid decay time-scale and/or a slower decay time-scale.

In a further interrelated aspect, a latent parameter estimate is generated based on a data set and a latent parameter model being trained on a data corpus of time series to generate the latent parameter estimate. At each time step, two current latent parameter estimates are computed. One is derived from data accumulated in a forward direction from the first data point to the current time step, and the other derived from data accumulated in a backward direction from the last data point to the current time step. At each time step, two representative vectors are calculated based on the forward computation and the backward computation. Also, at each time step, a deviation quantity between the representative vectors of at the current time step or across nearby time steps is calculated. It is then determined, based on the calculated deviations, whether a change point exists.

In some variations, the representative vectors can be the vectors of latent parameter estimates. Also, the representative vectors can be the probability estimates derived from the model and the latent parameter estimates.

The deviation function can be a cosine distance, Euclidean distance, Jensen-Shannon divergence, Jeffrey's distance, or Hellinger coefficient.

A Monte-Carlo sample of a plurality of time-series can be generated, where the time-series can be computed using a resampling procedure that does not presuppose a change-point to be present in the time-series. Also, the deviation quantities substituting the resampled time series for the original time series can be computed.

The time-series of deviation quantities can be normalized on the observed data with the time-series of deviation quantities from resampled data to generate an improved time-series of deviation quantities.

In some variations, the normalization is performed by subtracting the mean of the time-series of deviation quantities from resampled data from the time-series of deviation quantities from observed data to generate an improved time-series of deviation quantities.

Also, the maximum value of the corrected time-series over the time-series can be located. A z-score can be computed at the location of the maximum value by dividing the corrected time-series by the standard deviation of the resampled time-series at the same location. The statistical significance of a hypothesized change-point with the z-score can then be determined.

The data corpus can be at least partially composed of synthesized data.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory, i.e. a non-transitory machine-readable medium, may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. Some important problem settings involve the observation of a data corpus, many time series of a generally similar nature, each presumably drawn from some generally similar underlying mechanism but each with different parameter settings. The current subject matter may learn deeper statistical properties contained implicitly in the data corpus and improve the modeling of any individual time series, and consequently, improve the performance and interpretability of a change-point estimator or anomaly estimator, such as those discussed in the subject matter described herein.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the detection of behavioral anomalies and change points, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
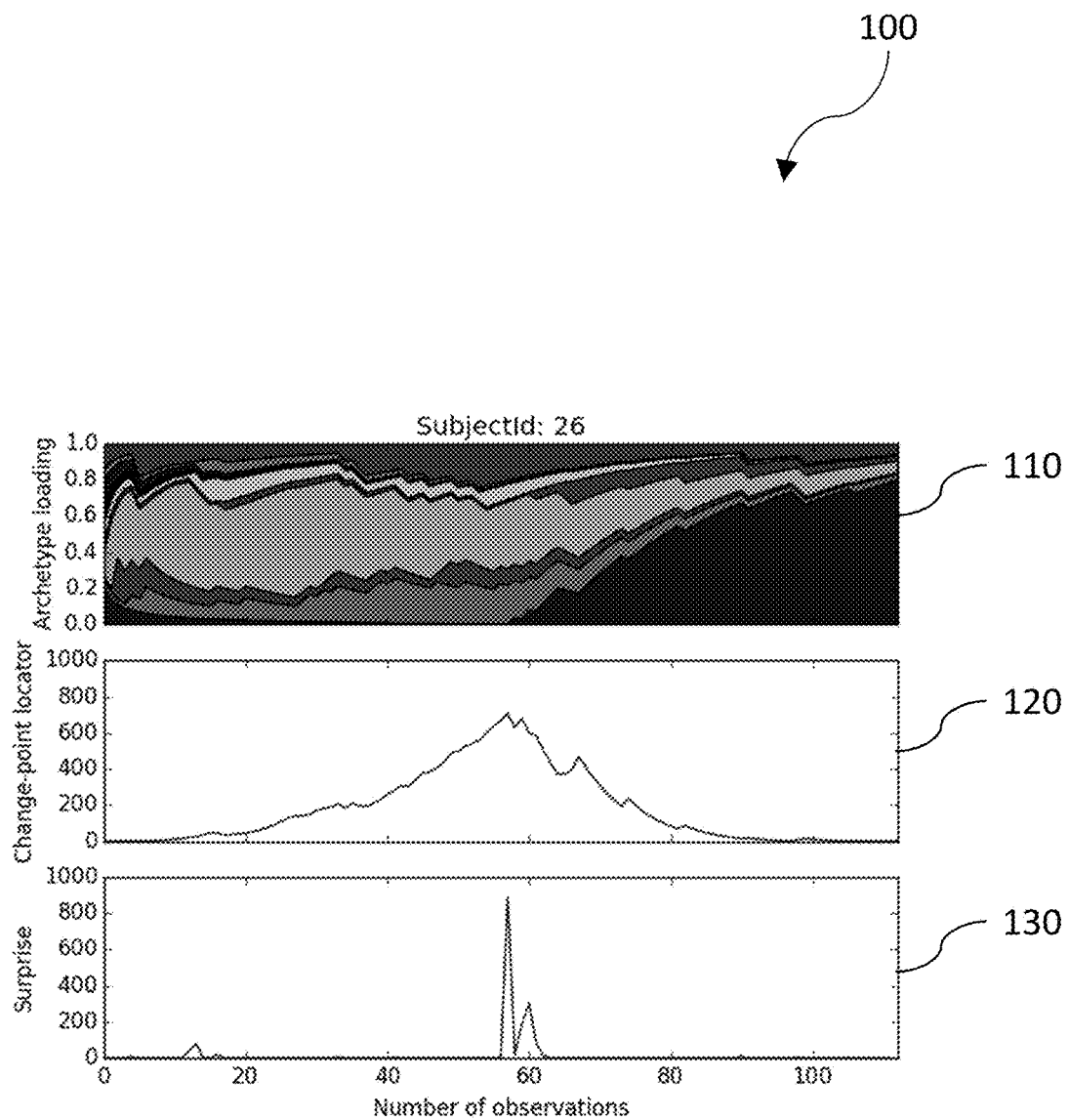
FIG. 1 is a diagram illustrating a running archetype distribution and a calculated change point locator and instantaneous surprise score.

The current subject matter is directed to methods, systems, apparatus, articles/computer program products for detecting behavioral anomalies and change-points.

The theme of using collective behaviors to improve individualized predictions is central to "collaborative filtering", a class of techniques developed originally for taste and purchase prediction in large internet merchants (e.g. Netflix and Amazon) but are applicable to many problems such as is addressed herein.

Two essential quantities related to change events can be produced using collaborative filtering techniques and additional statistical formulae: a surprise score that is an instantaneous indication of possible change events; and a change-point locator score that utilizes forward and backward estimates of event behavior to indicate points in time series data where the change-event occurred which is refined with more and more historical data—valuable for monitoring surprise events. These techniques have a broad set of applications, described below in an exemplary case of continuous monitoring of sensitive employees.

For instance, in a store setting, the data stream might be category codes of items purchased (or browsed) by a given user. A common task is to predict the probability the user will, in the future, buy an item in a given category. The large dataset of individual purchase histories permits a collaborative filter to discern that the user is similar to certain other users in some ways and use past data from those other users, directly, or indirectly, to make better predictions of future possibly un-seen events in their transaction history by characterizing the current user.

One class of collaborative filtering techniques involves mapping every individual user (more generally, the profiled entity) into space of "latent factors", or "archetypes" which collectively predict future behavior.

Often the directly observed space, for example, a set of item categories, might have a high cardinality (many possible values) and using only the previously observed data for a user, one could not make good estimates for many categories because of the sparse data. However, if the user can be evaluated against a set of "archetypes" or latent factors which represent distributions across the literal data elements, then higher quality predictions could be made. The archetypes would be estimated from the large data set and would represent abstraction of generally correlated behavior.

These archetypes are not superficial pairwise correlations of observed data at a superficial level (somebody who bought chips will buy salsa more frequently) but they would help estimate those quantities. In a grocery application, where the input data are items in purchase categories, examples of archetypes could often be centered around preferred cuisine genres and cooking habits, for example, one archetype ("Louisiana dishes") might include high concentrations of "crawfish", "okra", "Andouille sausage" in quantified proportions. These patterns can be derived from observed data alone with certain collaborative filtering technologies, using a large data set over a number of individual streams. Subsequently, time series of data regarding a new entity may be processed such that the particular archetype loadings, quantifying how consistent is the new data stream across the set of the trained archetypes, for this data may be estimated and updated sequentially. The present authors have described such a system in U.S. patent Ser. No. 13/725,561.

Background Checks

An institution may have a requirement to profile/evaluate the risk of certain employee behaviors. There may be non-numerical data regarding the history and activities of the people. It is typically considered risky if a person's previously stable behavior is observed to change into a distinctly different pattern. First, the common "unsupervised" (in the machine learning sense) situation related to change-point detection is discussed. The statistical model does not have knowledge nor is trained with previous examples of confirmed risk/no-risk tagging of events or people in the database, but uses the hypothesis that changes in a sensitive employee's behavior may be risky and deserve to be further investigated.

The behaviors in question which are turned into the categorical-valued data streams in our model may be of the nature of items considered in a "background or lifestyle check," for example in a classic security clearance scenario, and/or "transactions" or specific activities on-the-job, such as an insider fraud or information compromise scenario. Examples of categories and data elements typically evaluated for security risk/insider fraud:

Travel, landing at particular sensitive countries, purchase of airline tickets/mode of purchase, visa application, money & spending, loans, new credit, financial delinquency, job loss or promotion, investment gain loss, changes in bank balances, social activity on social networking internet forums, personal acquaintances, religion & political activities, family member challenges, virtues & vices, alcoholism/narcotics, healthy/risky hobbies, gambling, charity activities, domestic violence/family drama, problems with children, crime and punishment, arrests & conviction, employment reprimand, on-the-job attendance/working hours, information being accessed, requests for IT support, financial transactions, and inter-personal communication patterns.

Activities in these broad categories are assumed to be translated into data elements using a 'data dictionary'. This first dictionary needs to be human-designed for the purpose at hand. Given this data dictionary and many streams of observed data described with this dictionary across multiple individuals, the collaborative filter technology will recognize certain patterns of collective behaviors which may be a result of underlying syndromes. For instance, a person with increasing alcoholism may be noticed not just from overt data showing alcohol consumption, but also with increasingly poor job performance or attendance and domestic violence. One might expect these correlations to show themselves in a particular 'archetype', and understanding a person through their allocation to a certain archetype may be more enlightening and statistically powerful than the explicit data directly observed. Abrupt changes in these archetype loadings may give important insights to shifts in behavior that one has an opportunity to intercept and intervene.

The particular connections between the overt observations and their weighting across underlying archetypes are estimated quantitatively through the machine learning models on the data, which may also be called latent parameter models.

For detecting changes, or lack thereof, in behavior of individually identifiable streams of categorical (discrete) data, it can be assumed that there are a multitude of streams, each observed off a distinct entity (related to a person, for example), each with their own particular dynamics, but there are some certain regularities which can be exploited from a model trained on the large database.

In the first, training phase, models are built that translate from the observed data space, which could be quite high dimensional, to a lower dimensional 'archetype' space which encompass collective behaviors typically seen in the data. A data corpus, a set of multiple time series data associated with a large number of people/profiled entities, is assumed.

In particular, a preferred embodiment is to model the observed data corpus with a statistical "topic model", a set of techniques originally developed, but not restricted to, document classification. In this setting the "words" are equated to the directly observed categorical data, and the "topics" are the imputed archetypes estimated by the topic model, and "documents" are the sequence of data associated with particular entities.

In particular, a preferred embodiment is the use of the Latent Dirichlet Allocation (LDA) model, which is a Bayesian probabilistic method which simultaneously estimates probability distributions over archetypes (topics) to each of the profiled entities, and a probability distribution of data elements (words) for each topic. The latter, in the form of a matrix for an LDA model, which is referred to herein as the "model" and represents collective behaviors relating observed data to discovered archetypes. The number of archetypes is usually substantially lower than the cardinality of the word space so it can be considered a dimensionality reduction method.

In the scoring phase, two tasks are accomplished. First, detect in a timely fashion whether the new incoming observed data appears to be consistent or inconsistent with previously observed data on this person. Second, if there is a significant change, detect when, in time, did this switch (change-point) occur?

Disclosed is a method which updates an individual's 'archetype loading' or 'archetype distribution' sequentially given time series of new observations, and a model previously obtained by training with a data corpus. The data corpus can be partially or wholly composed of synthesized data. Over time, assuming stable behavior the archetype distribution for a person will reflect the relative frequency of various typical behavior clusters.

For an LDA model, some of the authors have previously disclosed in a patent application an algorithm for sequentially updating an estimate of the archetype distribution, given a stream of incoming data and a previously trained model.

Detecting Surprise Online

An online algorithm is described which provides a statistic which can be used to detect signs of changed behavior. A time series of categorical data associated with a profiled entity is provided, and, as new observations come in, signs of deviation from previous behavior are detected. Elements of the solution can include two features, a predictive estimator that quantifies likelihoods of future observations given past observations with this entity, and a computation of the surprise statistic.

In regard to the predictive estimator, a normalized probability estimate can be obtained from past observed data. Denote this probability estimator as $\hat{p}(x_t|X_{t-1})$ meaning the prediction for observed datum $x_t$ given the set of previously observed data through time t−1. Also, there can be an algorithm where a collaborative filtering model was previously trained on a large data set to provide a model, a sequential method to estimate latent parameters associated with the current profiled entity, and a probability estimator using the latent parameters (and optionally other data) to make predictive probability distribution for observing future data. A number of collaborative filtering models can be used, including Latent Dirichlet Allocation. Also, a global probability estimate can be pre-computed without reference to the current profiled entity's data where $\hat{p}_G(x)$ can be denoted as a global probability estimate of an observation, not particularly associated with the profiled entity. This may be obtained by outside knowledge or estimates from the data corpus used for training the model.

In regard to the computation of the surprise statistic, one algorithm can include:

a) Initialize parameters of estimator with appropriate default values.
b) For each newly observed datum $x_t$ compute an instantaneous surprise score, quantifying generally the deviation of the current word from the pattern of what would be expected given the past history. The predictive estimator can be computed without incorporation of the current observed datum in the predictive model and the current datum $x_t$ be scored against it. Unusual deviations from past behavior will be signaled with larger values of surprise statistics. A few examples are described:
  i) One choice of surprise score is an information theoretical measure, representing the relative log likelihood of observing this datum given past data on this profiled entity, compared to a global likelihood:

$$L_t = -\log \frac{\hat{p}(x_t|X_{t-1})}{\hat{p}_G(x_t)}$$

ii) One or more transformations of such surprise scores. For instance, $L'_t=F(L_t)$ with $F(\ )$ a monotonic function, such as, for example, $L'_t=\max(L_t,0)$, truncating likelihoods smaller than global likelihood,
  iii) Another transformation is $L''_t=\text{FILTER}(L_t)$, with FILTER being a causally computable filter, such as, without limitation an exponential moving average, or any other causally computable low pass filter.
  iv) $L'''_t=\text{FILTER}(L'_t)$, with FILTER being a causally computable filter, e.g. an exponential moving average, or any other causally computable low pass filter.
  v) A distance measure quantifying how much the new archetype allocation (or the probability distribution implied by it) has changed, e.g. $D_t=d(\theta_t,\theta_{t-1})$ for some appropriate distance measure for the space of archetype allocations. If, for example the archetype allocations $\theta_t$ are probability distributions, then appropriate distance measures are any of the typically used measures on distributions, e.g. cosine distance, mean squared distance, mean absolute deviation distance, Euclidean distance, Jensen-Shannon divergence, Jeffrey's distance, Hellinger coefficient, etc.
  vi) Subtractive or divisive normalizations of the distance measure $D_t$, such as normalizing by the average value of $d(\ )$ over previous data events seen on this particular user, or over the entire training set; additionally, normalizations which represent the typical level of distance deviation for the particular data seen on the training set but irrespective history on the current time series.
  vii) Similar to ii), truncations of $D_t$ (normalized or not).
  viii) Causally computable filters of v), vi), or vii).
c) Optionally, apply a monotonic function of the preferred statistic in b). For example, a score calibration to bring the value of the statistic into an appropriate range for display and human interpretation. Another example is to or truncate, or limit values above, below or both upper and lower limits.
d) Update predictive model taking into account observed datum $x_t$.
e) Advance time.
f) Repeat steps b) through e) for all incoming data.

The surprise score at a given time only depends on the data observed up to, and including that time, i.e. that it is causally computable.

Estimating Presence and Location of a Change-Point

A retrospective algorithm (requiring storage of the entirety of observed data time series so far) is described for locating the time and strength of a potential change-point in the dynamical properties where data $x_t$ can be observed for $t \in [1,T]$.

a) Estimate two models, one a forward model starting with t=1, and a backward model with t=T. Update the forward model normally as done in the previous section, and update the backward model with data in reversed order.

b) For each time, compute a representative vector which reflects the learned models. Call these vectors $\theta_{t,F}$ and $\theta_{t,B}$ so that the first refers to using data from times 1 to t in forward order, and the second using data from T to t in reverse order.
  i) $\theta_{t,*}$ can be computed using a collaborative filtering model.
  ii) $\theta_{t,*}$ can be a probability vector of an allocation to latent factors.
  iii) The latent factors can be topic estimates of a Latent Dirichlet Allocation model.
  iv) $\theta_{t,*}$ can be predictive probability estimates of the data for the next time step forward.

c) A change-point can be hypothesized to exist between two observed points. Compute $C_t = d(\theta_{t,F}, \theta_{t+1,B})$ where d( ) is an appropriate deviation or distance measure between the vectors. Large values of $C_t$ indicate that the properties of the time series is different between [1,t] and [t+1,T]. The location of the change-point is at the location of the largest value.
  i) In particular if $\theta_{t,F}, \theta_{t+1,B}$ are probability vectors, then d( ) may be a distance function used for probability distribution.
  ii) In particular where d( ) is the cosine distance, mean squared distance, mean absolute deviation distance, Euclidean distance, Jensen-Shannon divergence, Jeffrey's distance, Hellinger coefficient.

d) It is frequently the case that sequential models have a 'startup' learning phase, yielding inaccurate results when the number of data seen is small. In this event, statistically stationary data (with no actual change-point) will show values of $C_t$ which are larger at each end, because either the forward or backward estimator is immature compared to the other, and give a false indication of a change-point near the beginning or end of the data series. Therefore it may be corrected by the following procedure:
  i) Generate a Monte Carlo sample of a number of time series $C*_t^j$ f where each of the time series is computed using an appropriate bootstrapping or resampling procedure which does not presuppose any change-point. For instance, if the expected autocorrelation between data in the stationary case is low, then shuffling with or without replacement is important.
  ii) Compute a corrected statistic by subtracting the mean of the resampled statistics from the time series on the original data: $C_{t,corr} = C_t - \langle C*_t^j \rangle_j$
  iii) Identify the time for the most likely change point as the location of the maximum value of $C_{t,corr}$ over the time interval.
  iv) Compute a statistical z-score $$z = \frac{C - \langle C^{*,j} \rangle_j}{\text{std}[C^{*,j}]}$$

at the location of the maximum value. Under the null hypothesis and an assumed Gaussian distribution, which is a reasonable approximation, z will be distributed as a standard unit normal. Typical statistical inference principles imply that particularly large values of z, for example, more than 3 standard deviations, imply a significant rejection of the null hypothesis that there is no change-point in the observed data.

e) If desired, apply a monotonic calibration function calibration to $C_{t,corr}$ to bring the value of the statistic into an appropriate range for display and human interpretation. This is called the change-point locator score.

Example

The following describes some example plots of the methods on a synthetic data set. The data set was generated to represent a hypothetical security profile application. The synthetic data were generated from a set of artificial archetypes that are typically associated with certain signature social and economic events. For example, an episode of "financial stress" is typically associated with a sequence of loan, especially short-term, applications. Frequenting pornography websites usually indicates "sex addict" type. More relevantly, visiting religious forum filled with violent language and showing increasing interests in explosives typifies a subject's change towards "religious extremist". Collaborative filtering using the Latent Dirichlet Allocation model was performed on the corpus of thus synthesized time series data.

FIG. 1 is a diagram illustrating a running archetype distribution and a calculated change point locator and instantaneous surprise score. The top panel 110 shows the estimated loading of the latent factors (archetypes) per event starting with forward time. The middle panel 120 shows the results of the change-point estimation algorithm, $C_{t,corr}$, (change-point locator score) showing a strong possibility of a change-point at around event 56. A monotonic score calibration has been applied. The z-score at the peak (not shown) is substantial and strongly rejects the null hypothesis. The bottom panel 130 shows the results of the online surprise scoring algorithm $L'''_t$ (surprise score) having large values near the change-point. A monotonic score calibration has been applied. This data set has a high probability of having a change-point.

Figure 2:
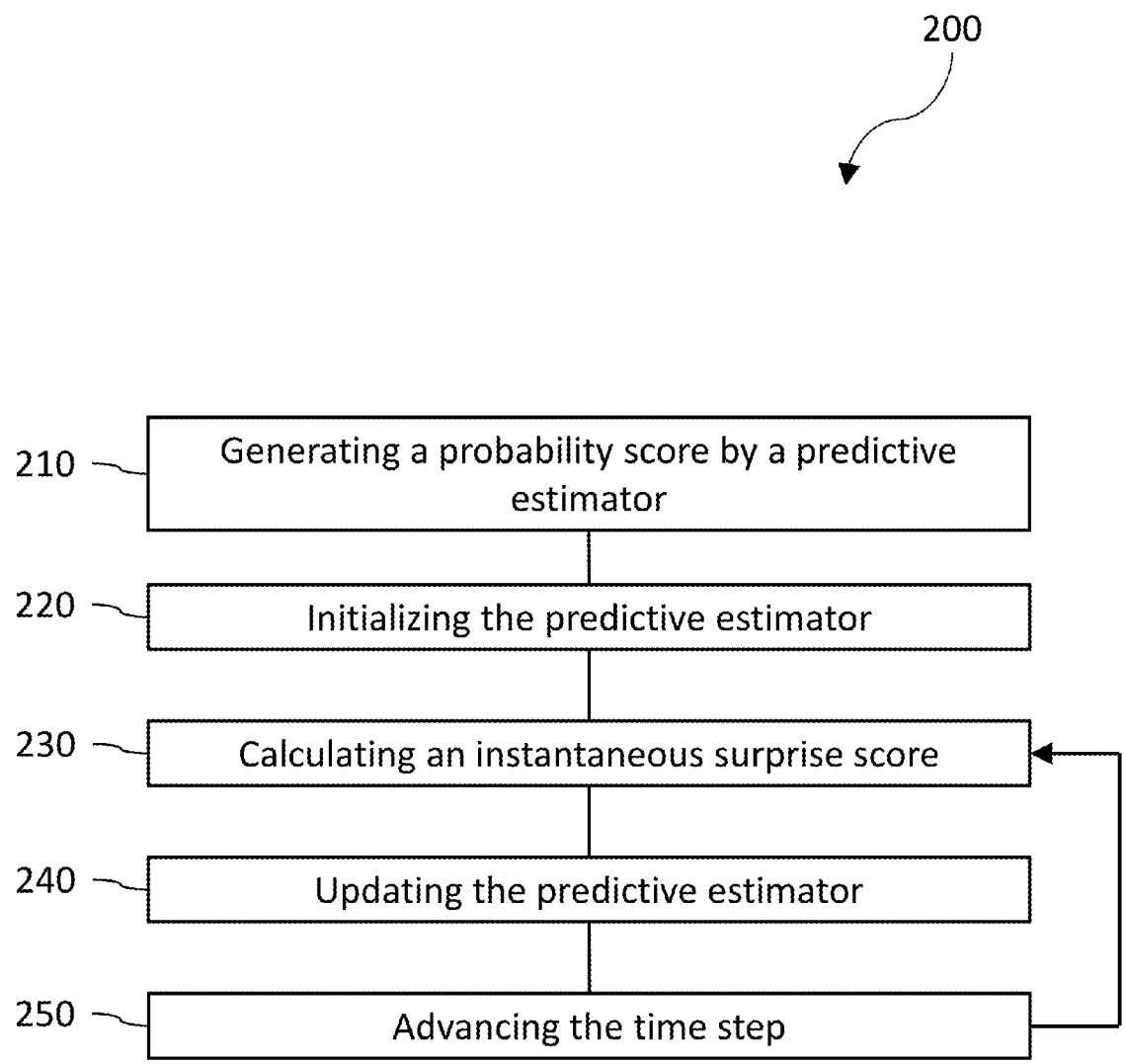
FIG. 2 is a process flow diagram illustrating generation of a probability estimate and the instantaneous surprise score.

FIG. 2 is a process flow diagram illustrating generation of a probability estimate and an instantaneous surprise score. Other methods of generation of the probability estimate and the surprise score can also be employed, with the present illustrating providing only one example thereof. In particular, operations can be performed using any of the transformations described above.

At 210, a probability estimate can be generated by the predictive estimator for an event related to an entity, the probability estimate based on an observed data set wherein the predictive estimator was trained on a large data corpus to provide a model and a sequential method to estimate latent parameters associated with the entity.

At 220, the predictive estimator can compute an instantaneous surprise score at a time step. The instantaneous surprise score is the deviation of a datum from the probability estimate. The computation can begin by initializing the predictive estimator with default values.

At 230, a calculation can be made for each of the datum input to the predictive estimator, a deviation of the datum from the probability estimate, where calculating can include generating a log likelihood of observing the datum given past data on the datum, compared to a global likelihood.

At 240, the predictive estimator can be updated with the datum.

At 250, the time step of the predictive model can be advanced, returning the process to 230.

Figure 3:
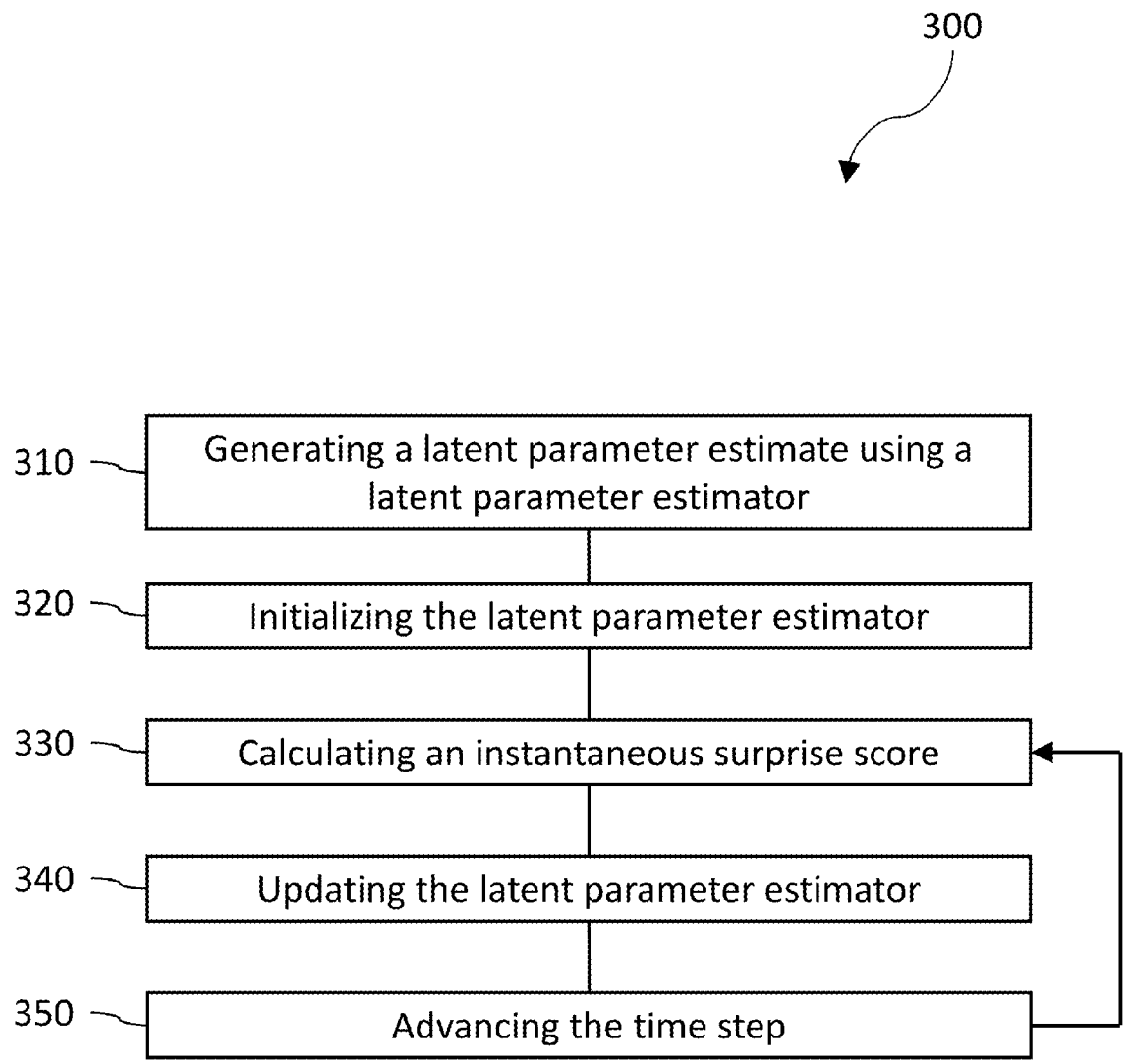
FIG. 3 is a process flow diagram illustrating generation of an instantaneous surprise score by a latent parameter estimator.

FIG. 3 is a process flow diagram 300 illustrating generation of an instantaneous surprise score by a latent parameter estimator.

At 310, a latent parameter estimate can be generated by the latent parameter estimator for an event related to an entity, the latent parameter estimate based on an observed data set wherein the latent parameter estimator was trained on a data corpus to provide a latent parameter model and a sequential method to estimate latent parameters associated with the entity. In some settings, when the statistical model is a topic model, the latent parameter estimates can be the estimated topic allocations for this entity using data observed up to a given time point, using the topic model trained on the data corpus, and a topic estimation algorithm designed for the type of topic model being used. An estimated topic allocation for an entity can be a vector of the strengths of association between the data set associated with this particular entity relative to each of the topics. The topics can be estimated using the data corpus and a training algorithm designed for the type of topic model. In some settings, the latent parameter estimates can be a probability distribution over topics At 320, the latent parameter estimator can compute an instantaneous surprise score at a time step. The instantaneous surprise score can also be a deviation measure between latent parameter estimates, or functions thereof, where at least one of the latent parameter estimates has a rapid decay time-scale, and least one of the latent parameter estimates has a slower decay time-scale. Alternatively, the instantaneous surprise score can be a deviation measure on the latent parameter estimates, or functions thereof, before and after they have been updated with the current datum. The computation can begin by initializing the latent parameter estimator with default values.

At 330, a calculation can be made for each of the datum input to the latent parameter estimator, a deviation of the datum from the latent parameter estimate, where calculating can include generating a log likelihood of observing the datum given past data on the datum, compared to a global likelihood.

At 340, the latent parameter estimator can be updated with the datum.

At 350, the time step of the latent parameter model can be advanced, returning the process to 330.

Figure 4:
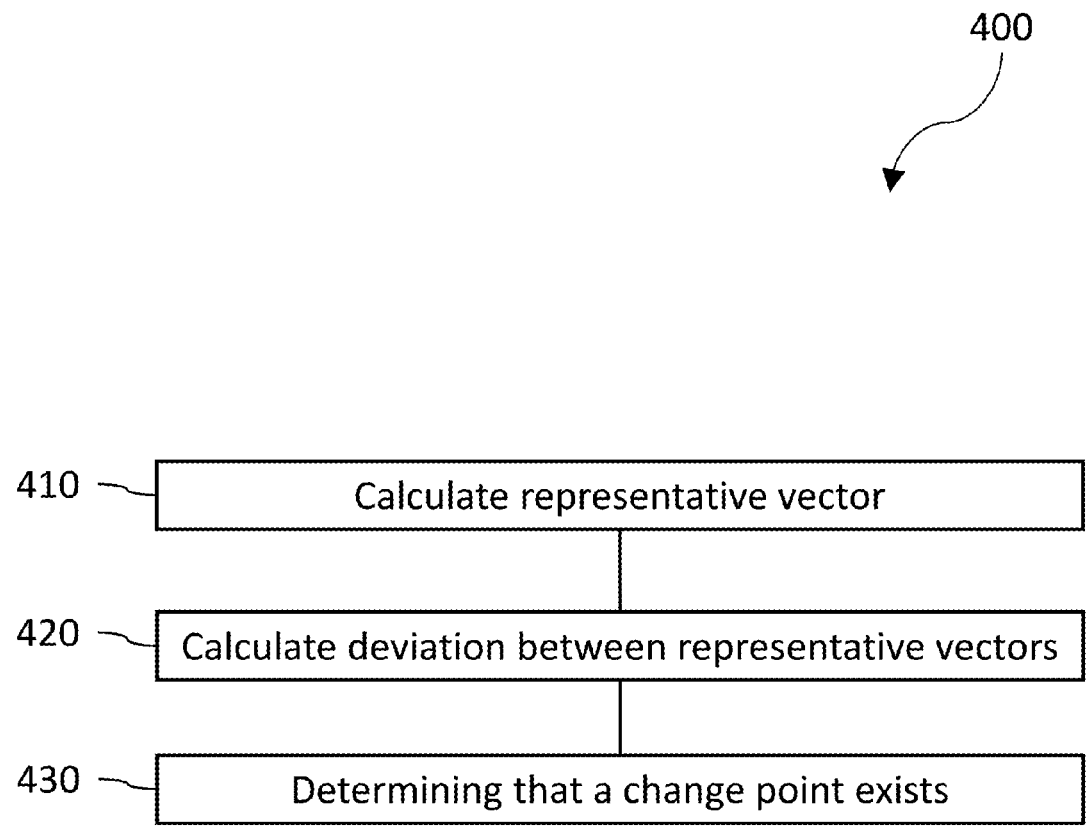
FIG. 4 is a process flow diagram illustrating determination of the existence or location of a change point from a change point locator score.

FIG. 4 is a process flow diagram 400 illustrating determination of the existence of a change point. The process illustrated provides more detail as to the operations occurring in 230. At 410, a forward time-series model and a backward time-series model, can be used at each time step to calculate a representative vector based on the forward time-series model and the backward time-series model.

At 420, a deviation can be calculated, across the time step, between the representative vectors, the deviation being calculated using a distance function.

At 430, it can be determined if a change point exists based on the calculated deviation.

Example of Operational Use of Scores

In some situations new data may come in at sufficiently slow intervals that one may make a choice of whether to act after each new datum is observed, based both on the surprise score and the change-point locator score, which are recomputed at each time step. For example, consider an insider fraud or compromise setting where the data streams are abstractions of behaviors by various subjects. The instantaneous surprise score may show a high value above a threshold immediately if some otherwise improbable events occur, and may alert a risk manager that the subject ought to be monitored more carefully. However, this may simply be a false positive, and the difference cannot be resolved without observing a few more data points. If there were a true behavioral shift at this moment, then as additional data points are observed, the change-point locator score will show an increasingly large peak at a time corresponding to the most likely change-point in the series. This identification of the time of compromise could be important for forensic analysis or operational decisions, such as restricting access by the subject. However, a false positive on the instantaneous surprise score (an unlikely event followed by more events returning to the original pattern) would not show this behavior in the change-point locator score: as any small peak would return back to nearly zero as more in-pattern data points are observed. Additionally, the z-score computation accompanying the change-point locator score can be used to judge statistical significance of a peak and influence operational decisions.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A method comprising:
generating, by a predictive estimator, a probability estimate for data related to an entity, the probability estimate based on a sequence of data received by the predictive estimator, the predictive estimator being trained on a data corpus to provide the probability estimate;
computing, with the predictive estimator, at a time step of a time series, an instantaneous surprise score, the instantaneous surprise score being a quantification of a short-term deviation of a current datum from the probability estimate, the computing comprising:
initializing the predictive estimator with default values of the predictive estimator;
calculating, for at least one data input of the current datum to the predictive estimator, the instantaneous surprise score corresponding to a deviation of the data input from the probability estimate;
generating a probability of observing the current datum based on past data on the entity and the predictive estimator trained on the data corpus;
updating the predictive estimator based on the current datum; and
advancing the time step in the predictive estimator; computing,
at least one time step of the time series, a first and a second latent parameter estimates, the first latent parameter estimate derived from data accumulated in a forward direction from the first data point to the current time step, and the second latent parameter estimate derived from data accumulated in a backward direction from the last data point to the current time step;
calculating, at least one time step of the time series, at least two representative vectors based on the forward computation and the backward computation;
determining whether a change point exists based on the two representative vectors;
identifying, based on the change point and the instantaneous surprise score, a security risk and/or fraud, and
restricting, based on the identifying, access of an individual to an area and/or a system.

2. The method of claim 1, wherein the instantaneous surprise score is transformed according to at least one transformation comprising:
a normalization by a probability estimate not particular to the entity, or by a function of such a probability estimate,
a negated logarithm function,
a truncation which limits either low or high values, or both, to be no smaller, or no greater than a lower and upper limit,
a filter of a sequence of surprise scores or transformation of such scores,
a normalization by one or more filters of instantaneous surprise scores or transformations of such scores, and
a calibration function.

3. The method of claim 1, wherein the data corpus is at least partially composed of synthesized data.

4. The method of claim 1, the determining comprises:
determining, at least one time step, a change point locator score based on a deviation between the two representative vectors; and
identifying a location of the change point based on a time step associated with a highest change point locator score of the calculated change point locator scores of the time series, wherein a larger deviation between the two vectors results in a higher change point locator score.

5. The method of claim 1, further comprising:
calculating, at least one time step, a deviation quantity between the two representative vectors, or functions thereof, at the current time step or across nearby time steps, and
wherein the determining comprises determining a location of the change point based on the calculated deviation quantity at least one time step.

6. A method comprising:
generating, by a latent parameter estimator, one or more latent parameter estimates for data related to an entity, the latent parameter estimates based on a sequence of data received by the latent parameter estimator, the latent parameter estimator being trained on a data corpus to provide the latent parameter estimate;
computing, with the latent parameter estimator, at a time step of a time series, an instantaneous surprise score, the instantaneous surprise score being a quantification of a change of latent parameter estimates, the computing comprising:
initializing the latent parameter estimator with default values of the latent parameter estimator;
calculating, for at least one data input of a current datum to the latent parameter estimator, an instantaneous surprise score corresponding to a function of one or more of the latent parameter estimates;
updating the latent parameter estimator with the current datum; and
advancing the time step in the latent parameter estimator;
computing, at least one time step of the time series, two current latent parameter estimates, one derived from data accumulated in a forward direction from the first data point to the current time step, and the other derived from data accumulated in a backward direction from the last data point to the current time step;
calculating, at least one time step of the time series, two representative vectors based on the forward computation and the backward computation;
determining whether a change point exists based on the two representative vectors;
identifying, based on the change point and the instantaneous surprise score, a security risk and/or fraud, and
restricting, based on the identifying, access of an individual to an area and/or a system.

7. The method of claim 6, wherein the latent parameter model is a topic model.

8. The method of claim 7, wherein the latent parameter estimates are estimated topic allocations using data observed up to a given time point.

9. The method of claim 6, wherein the instantaneous surprise score is a deviation measure on the latent parameter estimates, or functions thereof, before and after they have been updated with the current datum.

10. The method of claim 6, wherein the instantaneous surprise score is a deviation measure between latent parameter estimates, or functions thereof, at least one of which has a rapid decay time-scale, and least one of which has a slower decay time-scale.

11. A method comprising:
generating a latent parameter estimate based on a data set and a latent parameter model, the latent parameter model being trained on a data corpus of a time series to generate the latent parameter estimate;
computing, at least one time step, two current latent parameter estimates, one derived from data accumulated in a forward direction from the first data point to the current time step, and the other derived from data accumulated in a backward direction from the last data point to the current time step;
calculating, at least one time step, two representative vectors based on the forward computation and the backward computation;
calculating, at least one time step, a deviation quantity between the representative vectors, or functions thereof, at the current time step or across nearby time steps; and
determining whether a change point exists based on the calculated deviations;
identifying, based on the change point and the instantaneous surprise score, a security risk and/or fraud.

12. The method of claim 11, wherein the representative vectors are the vectors of latent parameter estimates.

13. The method of claim 11, wherein the representative vectors are the probability estimates derived from the model and the latent parameter estimates.

14. The method of claim 11, wherein the deviation function is selected from any one of: a cosine distance, Euclidean distance, Jensen-Shannon divergence, Jeffrey's distance, and Hellinger coefficient.

15. The method of claim 11, wherein the latent parameter model is a topic model.

16. The method of claim 11 further comprising:
generating a Monte-Carlo sample of a plurality of time-series, wherein the time-series is computed using a resampling procedure that does not presuppose a change-point to be present in the time-series;
computing the plurality of deviation quantities substituting the resampled time series for the original time series; and
normalizing the time-series of deviation quantities on the observed data with the time-series of deviation quantities from resampled data to generate an improved time-series of deviation quantities.

17. The method of claim 16, wherein the normalization is performed by subtracting the mean of the time-series of deviation quantities from resampled data from the time-series of deviation quantities from observed data to generate an improved time-series of deviation quantities.

18. The method of claim 17 further comprising:
locating the maximum value of the corrected time-series over the time-series;
computing a z-score at the location of the maximum value by dividing the corrected time-series by the standard deviation of the resampled time-series at the same location; and
determining the statistical significance of a hypothesized change-point with the z-score.

19. A non-transitory computer program product storing instructions that, when executed by at least one programmable processor, cause the at least one programmable processor to perform operations comprising:
generating, by a predictive estimator, a probability estimate for data related to an entity, the probability estimate based on a sequence of data received by the predictive estimator, the predictive estimator being trained on a data corpus to provide the probability estimate;
computing, with the predictive estimator, at a time step of a time series, an instantaneous surprise score, the instantaneous surprise score being a quantification of a short-term deviation of a datum from the probability estimate, the computing comprising:
initializing the predictive estimator with default values of the predictive estimator;

calculating, for at least one data input of the datum to the predictive estimator, the instantaneous surprise score corresponding to a deviation of the data input from the probability estimate;
generating an estimate of the probability of observing the datum based on past data on the entity and the model trained on the data corpus;
updating the predictive estimator with the datum; and
advancing the time step in the predictive estimator;
computing, at least one time step of the time series, two current latent parameter estimates, one derived from data accumulated in a forward direction from the first data point to the current time step, and the other derived from data accumulated in a backward direction from the last data point to the current time step;
calculating, at least one time step of the time series, two representative vectors based on the forward computation and the backward computation; and
determining whether a change point exists based on the two representative vectors;
identifying, based on the change point and the instantaneous surprise score, a security risk and/or fraud.

20. A system comprising:
at least one programmable processor; and
a non-transitory machine-readable medium storing instructions that, when executed by the at least one processor, cause the at least one programmable processor to perform operations comprising:
generating, by a predictive estimator, a probability estimate for data related to an entity, the probability estimate based on a sequence of data received by the predictive estimator, the predictive estimator being trained on a data corpus to provide the probability estimate;
computing, with the predictive estimator, at a time step of a time series, an instantaneous surprise score, the instantaneous surprise score being a quantification of a short-term deviation of a datum from the probability estimate, the computing comprising:
initializing the predictive estimator with default values of the predictive estimator;
calculating, for at least one data input of the datum to the predictive estimator, the instantaneous surprise score corresponding to a deviation of the data input from the probability estimate;
generating an estimate of the probability of observing the datum based on past data on the entity and the model trained on the data corpus;
updating the predictive estimator with the datum; and
advancing the time step in the predictive estimator;
computing, at least one time step of the time series, two current latent parameter estimates, one derived from data accumulated in a forward direction from the first data point to the current time step, and the other derived from data accumulated in a backward direction from the last data point to the current time step;
calculating, at least one time step of the time series, two representative vectors based on the forward computation and the backward computation;
determining whether a change point exists based on the two representative vectors; and
identifying, based on the change point and the instantaneous surprise score, a security risk and/or fraud.

* * * * *